(No Model.)
S. S. SPRAGUE.
Piston Packing.
No. 230,206.  Patented July 20, 1880.
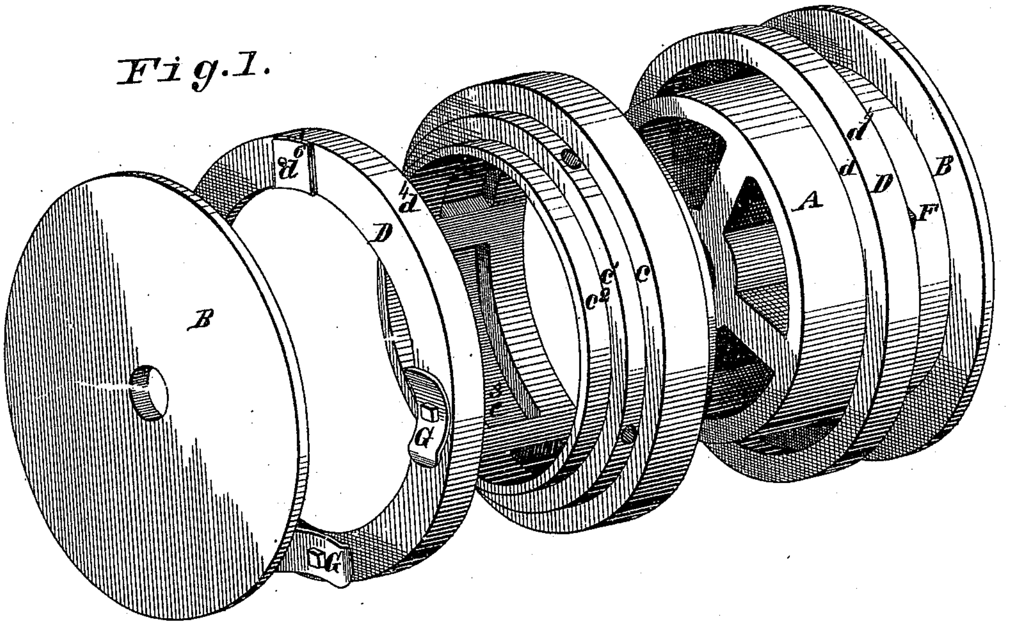
Fig. 1.
Fig. 2.
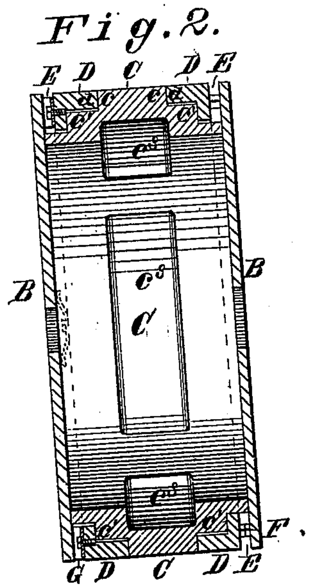
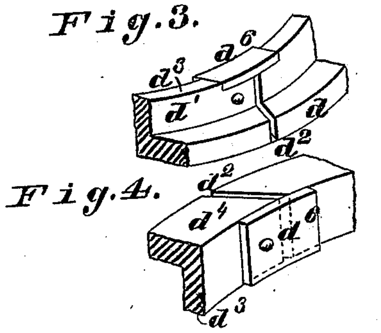
Fig. 3. Fig. 4.
Fig. 6.
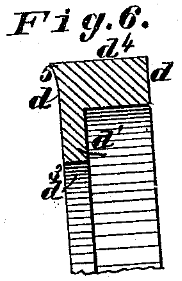
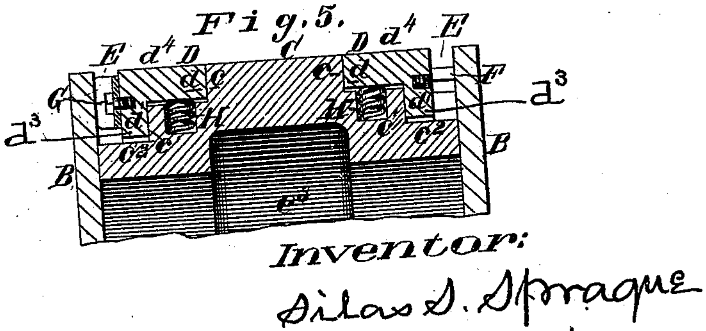
Fig. 5.
Attest.
Charles Pickles
Saml. S. Boyd
Inventor:
Silas S. Sprague.
by C. D. Moody atty.
N. PETERS, PHOTO-LITHOGRAPHER, WASHINGTON, D. C.

UNITED STATES PATENT OFFICE.

SILAS S. SPRAGUE, OF ST. LOUIS, ASSIGNOR OF ONE-HALF OF HIS RIGHT TO WILLIAM W. COREY, OF ST. LOUIS COUNTY, MISSOURI.

PISTON-PACKING.

SPECIFICATION forming part of Letters Patent No. 230,206, dated July 20, 1880.

Application filed May 21, 1880. (No model.)

*To all whom it may concern:*

Be it known that I, SILAS S. SPRAGUE, of St. Louis, Missouri, have made a new and useful Improvement in Piston-Packing, of which the following is a full, clear, and exact description, reference being had to the annexed drawings, making part of this specification, in which—

Figure 1 is a view, in perspective, showing a piston and the improved packing, the various portions thereof being opened apart; Fig. 2, a central section of the packing and piston-followers; and Figs. 3, 4, 5, 6, details—Figs. 3 and 4 being perspective views, from opposite sides, respectively, of a portion of one of the packing-rings; Fig. 5, a sectional view of the packing and piston-followers, and showing the springs used in expanding the packing-rings; and Fig. 6, a cross-section, upon an enlarged scale, of the packing-ring.

The same letters denote the same parts.

The present invention is an improvement in metallic ring-packing; and it consists, mainly, in the combination of a central ring which encircles the piston-spider and two similar packing-rings arranged and fitted, respectively, upon the ends of the central ring, the several rings being shaped and connected and held together as hereinafter described.

Referring to the drawings, A represents the spider, and B B the followers, of a piston having the improvement, the spider and followers being of the usual description.

C represents a central ring, styled among engineers the "bull-ring." It is made to fit onto the spider A, but externally it is shaped as shown more distinctly in Figs. 2, 5—that is, with two offsets, and so as to form at each end of the ring three bearings, $c$ $c'$ $c^2$.

D D represent two expansible packing-rings, of L shape in cross-section, and shaped to fit onto the ring C, the inner faces, $d$ $d$, of the rings D D coming against the bearings $c$ $c$ and the faces $d'$ $d'$ coming against the bearings $c'$ $c'$.

The rings D D may be each in one piece, opened at $d^2$, or they may be made in sections.

Between the rings D D and the followers B B are spaces for the steam to enter and expand the rings, the steam passing through the spaces E E, in between the portions $d^3$ $d^3$ of the rings D D and the bearings $c^2$ $c^2$ of the ring C, causing the rings to expand in the usual manner. The steam at the same time presses the faces $d'$ $d'$ of the rings D D against the bearings $c'$ $c'$, cutting off the passage of steam beyond the bearings last named.

The faces $d^4$ $d^4$ of the rings D D are, as seen, much wider than the portions $d^3$ $d^3$, and if the rings bore only against the bearings $c'$ $c'$ they would not keep properly in place. The bearings $c$ $c$, however, largely prevent any tendency of the rings to twist, and, in addition thereto, the rings D D are furnished with projections in the form of screw-bolts F F or springs G G, which stand out from the end of the rings sufficiently for the followers B B to have a bearing thereupon. The effect is to hold the rings so that they can expand merely or turn around on the ring C, the projections F G preventing the rings, as the piston moves to and fro, from moving to and from the followers B B, as well as aiding to prevent the rings from rocking upon the ring C. The bolts F, as well as the springs G, can be adjusted, from time to time, to enable the followers to exert the proper pressure upon the rings.

The rings, when first applied, are fitted to the ring C at $c^3$ $c^3$; but when worn springs H H may be inserted to aid in expanding the rings.

The rings D D, upon their faces $d^5$ $d^5$, are made slightly concave, as seen in Fig. 6, the concavity beginning just at the periphery of the rings. The aim of this feature of the construction is to cause the steam, as soon as it is admitted, to be deflected downward to the bearings $c^2$ $c^2$, and to accomplish this properly the depression in the face $d^5$ must begin immediately at the periphery of the ring.

To prevent the steam from entering the opening $d^2$ in the ring a plate, $d^6$, is arranged opposite the opening, the plate being fastened to the face $d^5$ of the ring, and so that the ring can expand.

It will be noticed that the rings D D are free to turn around upon the ring C. This enables the packing-rings to wear more evenly than when fastened to the ring C. The ring C is hollowed out at $c^3$ to lighten it.

I claim—

1. The combination of the ring C, having the bearings $c$ $c'$ $c^2$, the rings D D, having the projections F, and the followers B B, substantially as described.

2. The rings D D, having the concavity in the faces $d^5$ $d^5$ extending as described, and for the purpose set forth.

3. The combination of the ring C, having the bearings $c$ $c'$ $c^2$, the L-shaped rings D D, and the springs H H, substantially as described.

SILAS S. SPRAGUE.

Witnesses:
C. D. MOODY,
CHARLES PICKLES.